United States Patent
Konishi et al.

(10) Patent No.: US 9,814,976 B2
(45) Date of Patent: Nov. 14, 2017

(54) GAME SYSTEM AND GAME EXECUTION CONTROL METHOD APPLIED THERETO

(71) Applicant: KONAMI DIGITAL ENTERTAINMENT CO., LTD., Tokyo (JP)

(72) Inventors: Kazuma Konishi, Minato-ku (JP); Suguru Hamada, Minato-ku (JP)

(73) Assignee: KONAMI DIGITAL ENTERTAINMENT CO., LTD., Minato-Ku, Tokyo (JP)

(*) Notice: Subject to any disclaimer, the term of this patent is extended or adjusted under 35 U.S.C. 154(b) by 294 days.

(21) Appl. No.: 14/371,418

(22) PCT Filed: Jan. 31, 2013

(86) PCT No.: PCT/JP2013/052243
§ 371 (c)(1),
(2) Date: Jul. 9, 2014

(87) PCT Pub. No.: WO2013/115326
PCT Pub. Date: Aug. 8, 2013

(65) Prior Publication Data
US 2015/0157934 A1 Jun. 11, 2015

(30) Foreign Application Priority Data
Feb. 3, 2012 (JP) ................................. 2012-022418

(51) Int. Cl.
*A63F 9/24* (2006.01)
*A63F 13/323* (2014.01)
(Continued)

(52) U.S. Cl.
CPC ............ *A63F 13/323* (2014.09); *A63F 13/35* (2014.09); *A63F 13/355* (2014.09); *A63F 13/792* (2014.09)

(58) Field of Classification Search
CPC ........ A63F 13/12; A63F 13/335; A63F 13/79; A63F 2300/407; A63F 13/69;
(Continued)

(56) References Cited

U.S. PATENT DOCUMENTS

2004/0266529 A1* 12/2004 Chatani ................... A63F 13/12 463/40
2006/0080702 A1* 4/2006 Diez ....................... A63F 13/12 725/30
(Continued)

FOREIGN PATENT DOCUMENTS

JP 2001-246146 A 9/2001
JP 2002-035415 A 2/2002
(Continued)

OTHER PUBLICATIONS

International Search Report—dated Mar. 19, 2013.

*Primary Examiner* — Justin Myhr
(74) *Attorney, Agent, or Firm* — Howard & Howard Attorneys PLLC (57) ABSTRACT

A game system allows a user to play a game in a similar way to a game machine. The game system includes a server device, a game machine, and a network terminal device. A game machine program makes a control device function as a device for making a user play a game and a device for accepting a predetermined service from the server device as well as identifying a user in cooperation with the server device. The server device is provided with a virtual game machine portion which executes the game machine program and makes a control unit thereof function as the device for making a user play the game and the device for accepting the service. The network terminal device is provided with an I/O control portion which makes the network terminal device function as a remote I/O device for the virtual game machine control portion.

6 Claims, 6 Drawing Sheets (51) Int. Cl.
*A63F 13/35* (2014.01)
*A63F 13/792* (2014.01)
*A63F 13/355* (2014.01)

(58) Field of Classification Search
CPC ...... A63F 2300/5533; A63F 2300/5566; A63F 13/35; A63F 13/795; A63F 2300/50; A63F 2300/535; A63F 2300/554; A63F 13/323; A63F 13/355; A63F 2300/61; G07F 17/3223; G07F 17/3225
See application file for complete search history.

(56) References Cited

U.S. PATENT DOCUMENTS

| | | | |
|---|---|---|---|
| 2007/0155486 A1* | 7/2007 | Futa | A63F 13/12 463/29 |
| 2007/0202941 A1* | 8/2007 | Miltenberger | G07F 17/32 463/25 |
| 2008/0081699 A1* | 4/2008 | Haeuser | A63F 13/12 463/42 |
| 2008/0220875 A1* | 9/2008 | Sohl | G07F 17/3276 463/42 |
| 2010/0210364 A1* | 8/2010 | York | A63F 13/79 463/43 |

FOREIGN PATENT DOCUMENTS

| | | |
|---|---|---|
| JP | 2002-325974 A | 11/2002 |
| JP | 2003-317008 A | 11/2003 |
| JP | 2006-175004 A | 7/2006 |
| JP | 2007-075466 A | 3/2007 |
| JP | 2007-301075 A | 11/2007 |
| JP | 2010-277538 A | 12/2010 |
| JP | 2011-004799 A | 1/2011 |
| JP | 2011-120744 A | 6/2011 |
| JP | 2011-206448 A | 10/2011 |
| KR | 10-2011-0121831 A | 11/2011 |

* cited by examiner

GAME SYSTEM AND GAME EXECUTION CONTROL METHOD APPLIED THERETO

CROSS REFERENCE TO RELATED APPLICATION

This application is a national stage application of PCT/JP2013/052243, filed Jan. 31, 2013, which claims priority to Japanese Patent Application No. 2012-022418, filed Feb. 3, 2012, the disclosures of which are hereby incorporated by reference in their entirety.

TECHNICAL FIELD

This invention relates to a game system and the like including, as client devices to a server device, a game machine and a network terminal device differing from the game machine.

BACKGROUND ART

As a game system utilizing a network such as the internet, known is a game system where a plurality of game machines and a server are communicably connected to each other, the game system allowing users of game machines to join a common game and progressing the game (see the patent literature 1, for example). Also, known is a game system where information is provided to a personal terminal device of a user as an Web content, the information being associated with a game on a game machine for commercial use (see the patent literature 2, for example).

CITATION LIST

Patent Literature

PTL 1: JP 2011-004799 A and PTL 2: JP 2006-175004 A.

SUMMARY OF INVENTION

Technical Problem

Even if a game machine installed in an amusement center or the like and a client device to be used by a user such as a personal computer and a portable type phone, the client device differing from the game machine, are connected to a shared server device, since performance of the client device is different from performance of the game machine, it is impossible to play a game of the game machine by utilizing the client device differing from the game machine, or impossible to accept service relating to the game-play at the client device from the server. Because of this, to play the game, a user has to go to a place where the game machine is installed. Thereby, timelike or geographical restriction is generated with respect to the game-play. This hinders increase of users.

Then, the present invention aims to provide a game system and the like which allows users to play a game as with a game machine by utilizing a network terminal device as a client device differing from the game machine.

Solution to Problem

A game system according to one aspect of the present invention is a game system including: a server device; a game machine which functions as a client device for the server device; and a network terminal device which functions for the server device as another client device that differs from the game machine, the game machine being provided with a game machine program which makes a computer unit of the game machine function as: a device making a user play a game; and a device accepting service from the server device, the service relating to game-play of the game as well as identifying a user in cooperation with the server device, wherein the server device is provided with a virtual game machine control device which makes a computer unit of the server device function as: the device making a user play the game; and the device accepting the service by executing the game machine program, and the network terminal device is provided with a computer unit of the network terminal device, the computer unit functioning as an input and output (I/O) control device which makes the network terminal device function as a remote I/O device for the virtual game machine control device by executing a predetermined I/O control program.

A game execution control method according to one aspect of the present invention is a game execution control method applied to a game system including: a server device; a game machine which functions as a client device for the server device; and a network terminal device which functions for the server device as another client device that differs from the game machine, the game machine being provided with a game machine program which makes a computer unit of the game machine function as: a device making a user play a game; and a device accepting service from the server device, the service relating to game-play of the game as well as identifying a user in cooperation with the server device, the game execution control method including the steps of: providing the network terminal device with a computer unit of the network terminal device, the computer unit functioning as an input and output (I/O) control device which executes a predetermined I/O control program, while providing the server device with a virtual game machine control device which executes the game machine program, making a computer unit of the server device function as the device making a user play the game and the device accepting the service, by executing the game machine program by the virtual game machine control device, and making the network terminal device function as a remote I/O device for the virtual game machine control device, by executing the predetermined I/O control program by the I/O control device.

According to the present invention, the virtual game machine control device is utilized while the network terminal device is made to function as the remote I/O device. Thereby, a user can play on the network terminal device the same game as the game machine, or can accept on the network terminal device service which the server device provides to a user of the game machine. Thereby, since it is possible to extend the number of places where the user plays the game to places other than where the game machine was installed, it is possible to relieve the timelike or geographical restriction against playing a game. Due to this, it is possible to expect the increase of users. As compared to an individual network terminal device, the server device has a high performance in general. By a configuration that the virtual game machine control device is provided on the server device and the network terminal device is made to function as the remote I/O device, as long as the network band sufficient to the transmission of game image and the like is secured, it is possible to make a user play a game on an environment comparable to the game machine. It is possible to limit the processing by the network terminal device to the I/O processing to a game, and execute on the server device the processing necessary for progressing the game such as calculation processing and data update. Thereby, it is possible to prevent from improper activities such as alteration of data by using the network terminal device.

In one aspect of the present invention, a virtual operation program may intervene as middleware between: an operating system for server which is software to be combined with the computer unit of the server device; and the game machine program, and the computer unit of the server device may be made to execute the game machine program through the virtual operation program to provide the virtual game machine control device. According to this invention, even if the operating system of the game machine is different from the operating system of the server device, it is possible to establish a virtual game machine on the server device by operating the game machine program on the server device.

In one aspect of the present invention, the server device may execute, as the service relating to the game-play, service that the server device stores play data in association with identification information of the user in a memory unit of the server device, the play data corresponding to a result of the game that the user played using either the game machine or the virtual game machine control device, and also the server device may identify the user and provide to either the game machine or the virtual game machine control device, the play data stored in association with the identification information of the user in the memory unit. According to this invention, the play data is loaded to the game machine or the virtual game machine control device from the server device, and the result of game which a user played is recorded in the play data and is stored in the memory unit of the server by using the game machine or the virtual game machine control device. Thereby, the user can resume the game continuing on from the last time. Accordingly, as compared to a conventional example that playing the game is impossible if the game machine is not used, it is possible to certainly relieve the timelike, or geographic restriction against the game-play.

In one aspect of the present invention, the server device may provide, as the service relating to the game-play, service that the server device matchmakes a plurality of users and makes the plurality of users participate in a common game, to the game machine and the virtual game machine control device. According to this invention, it is possible to make a user of the network terminal device and a user of the game machine join a common game to play the game together, or it is possible to make users of the network terminal devices join a common game to play the game together. Due to this, the range of a user who is possible to play a common game expands. Accordingly, it is possible to enhance the magnetism of the game system. Since not only the user of the game machine, but also the user of the network terminal device is taken as a matchmaking object, it is possible to increase the number of users as matchmaking candidates. Accordingly, it is possible to enhance the possibility to establish successful matchmaking, or possible to expect the diversification of matchmaking.

In one aspect of the present invention, the game machine may be configured so that the game-play is allowed in exchange of payment of a predetermined game-play charge, and the server device may comprise an electronic payment device which executes the payment of the predetermined game-play charge of a user by an exchange of electronic information, when the game is played with the virtual game machine control device. According to this invention, even if the network terminal device does not have a function of payment of charge by current money (cash) or substitute money, by utilizing the virtual game machine control device while making the network terminal device function as the remote I/O device, it is possible to make the user play the game for profit. Thereby, it is possible to expand the range of network terminal devices which are available as the remote I/O devices for the virtual game machine control device.

Effects of Invention

As mentioned above, according to the present invention, by utilizing the virtual game machine control device on the server device while making the network terminal device function as the remote I/O device, it is possible to play on the network terminal device the same game as the game machine, or possible to accept on the network terminal service the server device provides to the game machine. Due to this, since it is possible to extend the number of places where the user plays the game to places other than where the game machine was installed, it is possible to relieve the timelike or geographic restriction against playing a game, and possible to expect the increase of users. In addition, according to the present invention, the virtual game machine control device is provided on the server device which has high performance as compared to the network terminal device. Thereby, it is possible to also perform the following effects: it is possible to make a user play a game on an environment comparable to the game machine, and possible to prevent from improper activities such as alteration of data by using the network terminal device.

DESCRIPTION OF EMBODIMENTS

Hereinafter, a game system according to one aspect of the present invention will be described. Firstly, referring to FIG. 1, an entire configuration of the game system will be explained. The game system 1 includes: a center server 2 as a server device; a plurality of game machines 3 which function as client devices for the center server 2; and a plurality of personal computers (hereinafter, sometimes referred to as the "PC" for short) 4 and a plurality of user terminals 5, which function for the center server 2, as client devices that differ from the game machines 3. Each of the PCs 4 and the user terminals 5 corresponds to a network terminal device of the present invention. The center server 2 is configured as a single logical server device in combination of a plurality of server units 2A, 2B . . . . However, the center server 2 may be configured as a single server unit. Alternatively, the center server 2 may be configured logically by utilizing the cloud computing.

Figure 1:
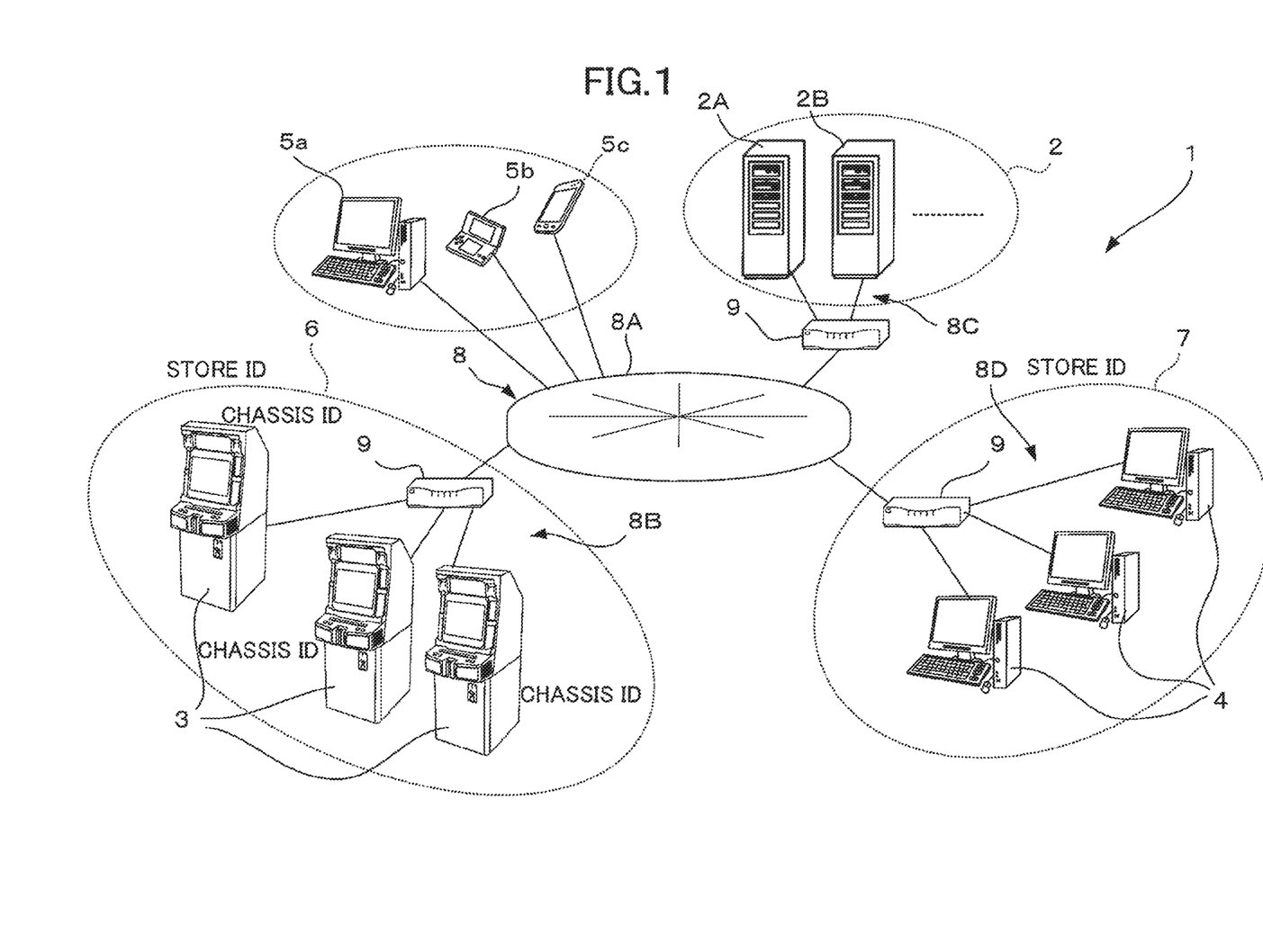
FIG. 1 is a diagram showing an entire configuration of a game system according to one aspect of the present invention.

Each of the game machines 3 is configured as a game machine for commercial use (business use) which allows a user to play a game in exchange of payment of a predetermined game-play charge. The game machine like this is sometimes called an arcade game machine. In this description, the game machine 3 will be sometimes referred to as the arcade game 3 to be distinguished from other type game machines. In FIG. 1, a single game store 6 is shown, but, actually, one or more game machines 3 are installed in each of plural game stores 6. The game store 6 is one example of a facility which provides service that a user is allowed to play a paid-for game provided by the arcade game machine 3. The conception of the game store 6 includes facilities called various kinds of names such as an amusement facility, an amusement arcade, an amusement hall, or the like. The game content to be executed by the game machine 3 may be selected appropriately. The games of the game machines 3 can be different from each other. The game machine 3 may be configured as a dedicated arcade game machine having a physical construction (for example, an operation unit or the like) applied to a particular game, or may be configured as a generalized arcade game machine where various kinds of games can be played by rewriting software.

The PC 4 is a network terminal device which is installed to a store 7 which is a commercial facility differing from the game store 6, and is lent to a user at a cost or for free. The store 7 is one example of facilities which provide service that a user is allowed to use the PC 4 for profit or for free. The store 7 corresponds to, for example, a facility such as so-called an internet café which is operated for lending a PC to a user. In addition, the conception of the store 7 also includes a case that the PC 4 is installed to a station, an airport, a hotel or the like with an aim to lend the PC 4 to a user. The PC 4 may be installed to a public facility as long as the PC 4 is lent to a user with a limitation of time or number of times. Hereinafter, the store 7 is sometimes called the general store 7 in order to distinguish the store 7 from the game store 6. The PC 4 itself is a generalized PC which can be used for personal use as well as commercial use. The PC 4 in the store 7 can be used not only for game-play of the game described later, but also in various kinds of way, such as so-called net surfing or game-play of PC game. In a case that the PC 4 is lent to a user for profit, the use charge may be time-charge, or may be charged to a user each time a predetermined tally-period comes, such as monthly, the user being recorded as a member.

The user terminal 5 is a network terminal device which is used for user's personal use. Various kinds of computer devices which are connected to the internet and also are used for personal use, such as a PC 5a, a portable game machine 5b, a portable phone (including a smart phone) or the like, can be used as the user terminals 5. The other computer devices such as a game machine for home use, a portable tablet terminal and the like, which are not illustrated, can be also used as the user terminals 5, as long as the computer devices function as network terminal devices and also are used for user's personal use.

The center server 2 and the game machines 3 are communicably connected to each other through a network 8. The network 8 includes the internet 8A as a WAN (a wide area network), a LAN (a local area network) 8B, and a LAN 8C. The LAN 8B is established for each store 2 and contains the game machines 3 of thereof. The LAN 8C contains server units 2A, 2B . . . of the center server 2 and connects those server units with each other. Each of the LANs 8B and 8C is configured as, for example, the intranet using the TCP/IP protocol. Each of the LANs 8B and 8C is connected to the internet 8A through a router 9. In addition, a local server may be installed between the game machines 3 and the router 9 of the store 6. In this case, the game machine 3 may be communicably connected to the center server 2 through the local server. The server units 2A, 2B . . . of the center server 2 can be connected to each other though the internet 8A in place of, or in addition to, the LAN 8C. In this description, a user means a person who can be a player of a game. An enterprise which operates the center server 2 and provides various kinds of service for the game machines 3, the PC 4, or the user terminals 5 is sometimes called a service provider. An enterprise which operates the store 6 or 7 is sometimes called an operator. Moreover, in order to distinguish between the operator of the game store 6 and the operator of the general store 7, the operator of the game store 6 and the operator of the general store 7 are sometimes called an arcade operator and a general operator respectively.

A unique IP address for identifying each of the game machines 3 and the center server 2 on the network 8 is assigned to each of the game machines 3 and the center server 2. In the communication between the game machines 3, or between the game machine 3 and the center server 2, a communication partner is specified utilizing the IP address. To each router 9, a fixed address unique on the internet 8A is set. To each game machine 3, a private address is set as the IP address. By the private address combined with the fixed address, a specific game machine 3 can be identified uniquely on the network 8. In this case, a virtual private network (a VPN) is configured between the game machine 3 and the center server 2, or between the game machines 3, and each game machine 3 is specified uniquely on the VPN by utilizing its private address.

Also, the PC 4 of the general store 7 is connected to the internet 8A through the LAN 8D and the router 9 so as to communicate with the center server 2. Moreover, the user terminal 5 is also connected to the internet 8A, and thereby, is communicable with the center server 2. Private networks and the like, provided by an internet connection enterprise, intervene between: each router 9 of the general store 7 and the user terminal 5; and the internet 8A, but the illustrations thereof are omitted. Also to each of the PCs 4 and the user terminals 5, a unique IP address is assigned in order to identify each of them on the network 8. The IP address may be so-called a dynamic address which changes each time the connection to the network 8 is established, or may be a fixed address which does not change. Hereinafter, information for identifying on the network 8, either the center server 2, the game machine 3, the PC 4, or the user terminal 5, is called the address information. In the communication through the network 8, unless otherwise noted, a partner which should be communicated with is specified based on the address information.

In the game system 1, aside from the address information mentioned above, a store ID is set to each of the game stores 6, the store ID being unique for each game store 6, and a chassis ID which is unique for each of the game machines 3 is set to each game machine 3. The center server 2 receives the store ID and the chassis ID from the game machine 3 as a communication partner, and thereby can specify uniquely the store 6 where the game machine 3 as the communication partner belongs and the game machine 3 itself. On the other hand, since the PC 4 and the user terminal 5 are installed regardless of the service provider's intention, any ID which is unique in the game system 1 like the chassis ID is not assigned to each of the PC 4 and the user terminal 5. Accordingly, when the center server 2 communicates with the PC 4 or the user terminal 5, the communication partners recognize each other by utilizing the address information mentioned above. However, with respect to the general store 7, in association with provision of a program from the service provider to the general operator, the program being necessary for making the PC 4 function as a remote I/O device in the present invention, a store ID unique for each general store 7 may be set to each general store 7 so that each store 7 is managed by the service provider with the store ID. Alternatively, in place of or in addition to the store ID, an operator ID unique for each general operator may be set to each of the general operators, and the general operator may be specified uniquely by the service provider or the center server 2.

The center server 2 provides various kinds of service through the network 8 to users of the game machine 3, the PC 4, and the user terminal 5. For example, the center server 2 provides various kinds of game services relating to a game executed by the game machine 3 to the users. For example, the game services include: the service that the center server 2 receives identification information of a user from the game machine 3 to identify the user, and receives from the game machine 3 and stores play data corresponding to the result of the user's game-play (the progress status, his/her game-play result, his/her score, obtained items and the like), or provides the play data to the user of the game machine 3 or the like; the service that the center server 2 matchmakes, when plural users play a common game through the network 8, the users; and the service that the central sever 2 updates computer programs or data of the game machine 3 through the network 8.

In addition, the center server 2 provides various kinds of Web services to a user accessing from the PC 4 or the user terminal 5 through the network 8. For example, the web services include: game information service that the center server 2 provides the users with various kinds of information relating to games through the Web site; and community service that the center server 2 provides a forum for information dispatch, information exchange, and information share by users.

Further, in the game system 1, it is possible to play on both of the PC 4 and the user terminal 5, the same game as the one provided by the game machine 3. The game system 1 is configured so as to make the user of the game machine 3, the user of the PC 4 and the user of the user terminal 5 join a common game to make them battle against each other or cooperate with each other. In this way, the center server 2 also provides service for realizing such game-play between the different kinds of client devices.

The center server 2 is provided with a charge service function which requires a charge as a counter value of paid-for service to a user and collects the charge from the user. In order to realize the charge service, an account of virtual money is provided for each user on the center server 2. When the user pays a predetermined charge by utilizing a payment means such as cash, a credit card, or the like, the amount of virtual money corresponding to the charge is added to the account of the user. And, in a case that the user uses paid-for service, the amount of virtual money corresponding to the use charge is consumed from the user's account. A game-play charge is included in one kind of use charges, and the user can pay the game-play charge by making the center server 2 consume the virtual money stored in his/her account.

In the game system 1, various kinds of hardware and software are prepared as components necessary for making the users use the various kinds of service. At least a part of the components are given or lent from the service provider to the operator. As one example, the game machines 3 and the router 9 are given for profit or for free to the arcade operator from the service provider. On the other hand, so-called a content, such as a program or data for the game to be executed by the game machines 3, is lent (provided) from the service provider to the operator. To the PC 4 and the user terminal 5, software necessary for making a user play the same game as the game of the arcade game machine 3 is provided from the service provider to each of the operator of the general store 7 and the user. When the user plays the game at the game machine 3 or the like, the game-play charge is required as a counter value of the game-play to the user. The service provider totalizes the game-play charges paid by the users for each predetermined tally-period to calculate the sales figures of the game system 1. The service provider distributes the sales figures to the service provider, the arcade operator and the general operator in accordance with a predetermined distribution ratio. The calculation function is also mounted to the center server 2.

Figure 2:
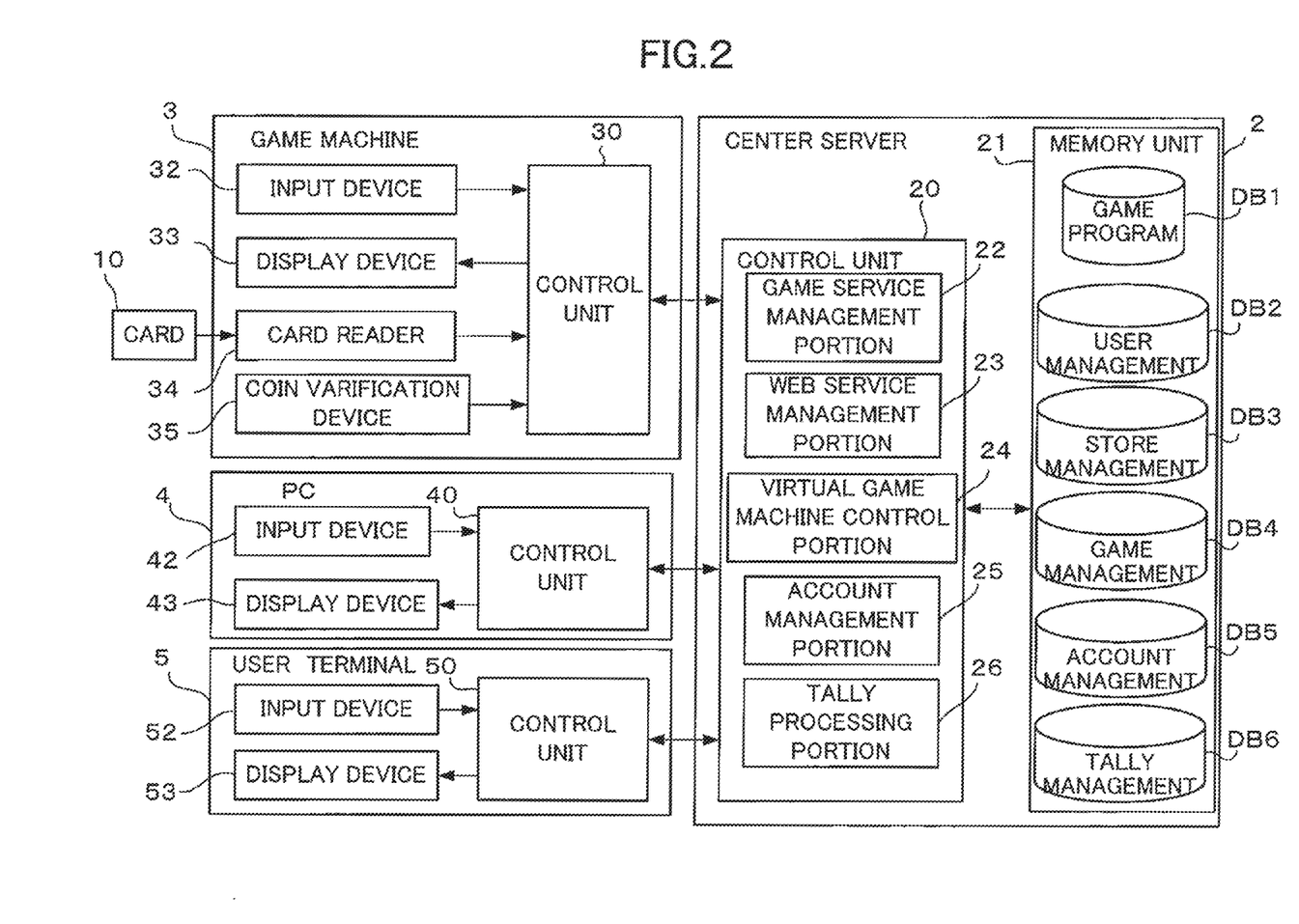
FIG. 2 is a functional block diagram of a main portion of the game system.

Next, with respect to the center server 2, the game machine 3, the PC 4 and the user terminal 5 in the game system 1, the configurations of main portions of control systems will be described in reference to FIG. 2. First, the center server 2 will be described. The center server 2 is provided with a control unit 20 and a memory unit 21. The center server 2 is also provided with an input device such as a key board or the like and an output device such as a monitor or the like, but the illustrations of them are omitted. The control unit 20 is a computer unit which is a combination of one or more micro processors and peripheral devices necessary for operations of the micro processors such as an inner memory device and the like. The memory unit 21 is provided as an outer memory device of the control unit 20, and stores various kinds of data bases DB1 to DB6 which should be referred to in the service provided by the center server 2.

A game program data base DB1 is a data base where programs of games to be executed by the game machine 3 (the game machine programs) and data are stored for each game title. A user management data base DB2 is a data base where information necessary for managing each user of the game system 1 is stored in association with a user ID which is unique for each user. A store management data base DB3 is a data base where information necessary for managing each game store 6 is stored in association with the store ID. For example, with respect to the data for managing the game store 6, information including: chassis IDs of the game machines 3 installed to the store 6, codes for identifying each game title to be executed by each game machine 3; the location of the store 6; and a settlement account for money transaction with the operator of the store 6, is stored in association with the store ID. In a case that an ID is set to each general store 7 or each general operator, information necessary for managing the general store or the general operator is also stored in association with the ID in the store management data base DB3. For example, with respect to the data for the general store 7, the information including: the location of the store 7; a settlement account for money transaction with the operator of the store 7 is stored in association with the store ID.

A game management data base DB4 is a data base where play data of a user, and a user ID or an ID unique for each user which is comparable to the user ID are correlated with each other and stored. The play data includes information relating to a game such as: game-play result of the user; progress status of the game; items the user obtained in the game. The user can confirm the past results of the game, or resume the game continuing on from the last game-play by referring to the play data. An account management data base DB5 is a data base where an account for virtual money which a user opened on the center server 2 and a balance of virtual money thereof are stored in association with the user ID. In a tally management data base DB6, stored is data relating to sales figures distribution such as: a tally value of the game-play charge paid by users in exchange of their game-play; and distribution values of the game service provider, the arcade operator, and the general operator respectively, with respect to the tally value.

In the control unit 20, a game service management portion 22, an Web service management portion 23, a virtual game machine control portion (a virtual game machine control device) 24, an account management portion 25, and a tally processing portion 26 are provided. Each of the portions 22 to 26 is a logical device which is realized by the combination of the control unit 20 as a hardware resource and predetermined software. The game service management portion 22 provides the game service above mentioned, and the Web service management portion 23 provides the Web service above mentioned. The virtual game machine control portion 24 provides service such that the virtual game machine control portion 24 generates on the center server 2, a virtual game machine in accordance with instructions from the PC 4 or the user terminal 5, and by utilizing the PC 4 or the user terminal 5 as a remote I/O device, the virtual game machine control portion 24 makes a user play the same game as the game machine 3, or makes the user accept service provided by the center server 2. The account management portion 25 manages addition operation and subtraction operation (consumption) of the virtual money in the account of each user which is stored in the account management data base DB5. The tally processing portion 26 tallies the game-play charges paid by users at each of the game machine 3, the PC 4, and the user terminal 5, and with respect to the sales figures calculated, calculates the distribution values for the service provider, the arcade operator, and the general operator respectively, and stores them in the tally management data base DB6.

Next, the game machine 3 will be described. The game machine 3 is provided with a control unit 30. The control unit 30 is a computer unit which is a combination of a micro processor and periphery devices necessary for operations of the micro processor such as an inner memory device and the like. To the control unit 30, an outer memory device capable of holding memory such as a hard disk memory device and the like is connected, but the illustration thereof is omitted. In the outer memory device for the control unit 30, game machine programs to be executed by the control unit 30 and various kinds of data which the programs should refer to are stored. The game machine programs and the data are obtained from the game program data base DB1, and distributed from the center server 2 to the game machine 3. When a user plays a game at the game machine 3, the user is identified by cooperation of the game machine 3 and the center server 2. Play data which is stored in association with the identification information of the user (the user ID, as one example) in the game management data base DB4 is provided from the center server 2 to the game machine 3, and the play data is stored in the memory device of the game machine 3.

To the control unit 30, an input device 32, a display device 33, a card reader 34 and a coin verification device 35 are connected. The input device 32 and the display device 33 are configured as with the devices of known game machines. The coin verification device 35 is provided to be available for a user to pay his/her game-play charge by cash (coins). When the user puts coins into the game machine 3, the coin verification device 35 determined whether the coins put by the user are true or not, and in a case that the coins are true, the coin verification device 35 outputs a signal indicating the number of coins put. The card reader 34 is provided to read out information of a card 10 owned by a user to output to the control unit 30 a signal corresponding to the information. The card 10 is provided with a non-volatile memory medium (not illustrated) such as an IC chip and magnetic stripe, and an ID unique for each card 10 (hereinafter, sometimes referred to as the card ID) and the like are stored in the medium. The card ID is used as information for the center server 2 to identify each user of the game machine 3.

In the user management data base DB2, recorded is a data table where the correlation between the card ID and the user ID is indicated. The center server 2 obtains the card ID from the game machine 3 to identify the user ID of the user of the game machine 3. Thereby, the center server 2 can specify the play data and the account of virtual money which are correlated to the user ID. In the game machine 3, the user can select the payment method for game-play by cash (coins) or by virtual money. In a case that the payment by virtual money is selected, the amount of virtual money corresponding to the game-play charge is consumed (subtracted) from the account of virtual money of the user by the account management portion 25. Due to this operation, the account management portion 25 functions as an electronic settlement device of the present invention. The card ID may be recorded in the card 10 in a bar code state or the like. Alternatively, in place of the card 10, the card ID may be recorded in a memory medium such as an IC chip provided to a portable phone or the like. The card ID is recorded in the medium as digital data to be read out electromagnetically, and also recorded in the card 10 or the like as letters, numerals, symbols and the like which the user can recognize.

The PC 4 and the user terminal 5 are provided with control units 40 and 50 as computer units respectively, and for those control units 40 and 50, also provided with input devices 42 and 52 and display devices 43 and 53 respectively. The control unit 40 of the PC 4 executes various kinds of calculations and operation control in accordance with a terminal operation system and application software which are provided in a memory device not illustrated. The control unit 50 of the user terminal 5 is also similar to the control unit 40 of PC 4. However, the user terminal 5 may be configured in various kinds of way depending on its intended purpose, as long as having a configuration capable of connecting with the internet 8A.

Figure 3:
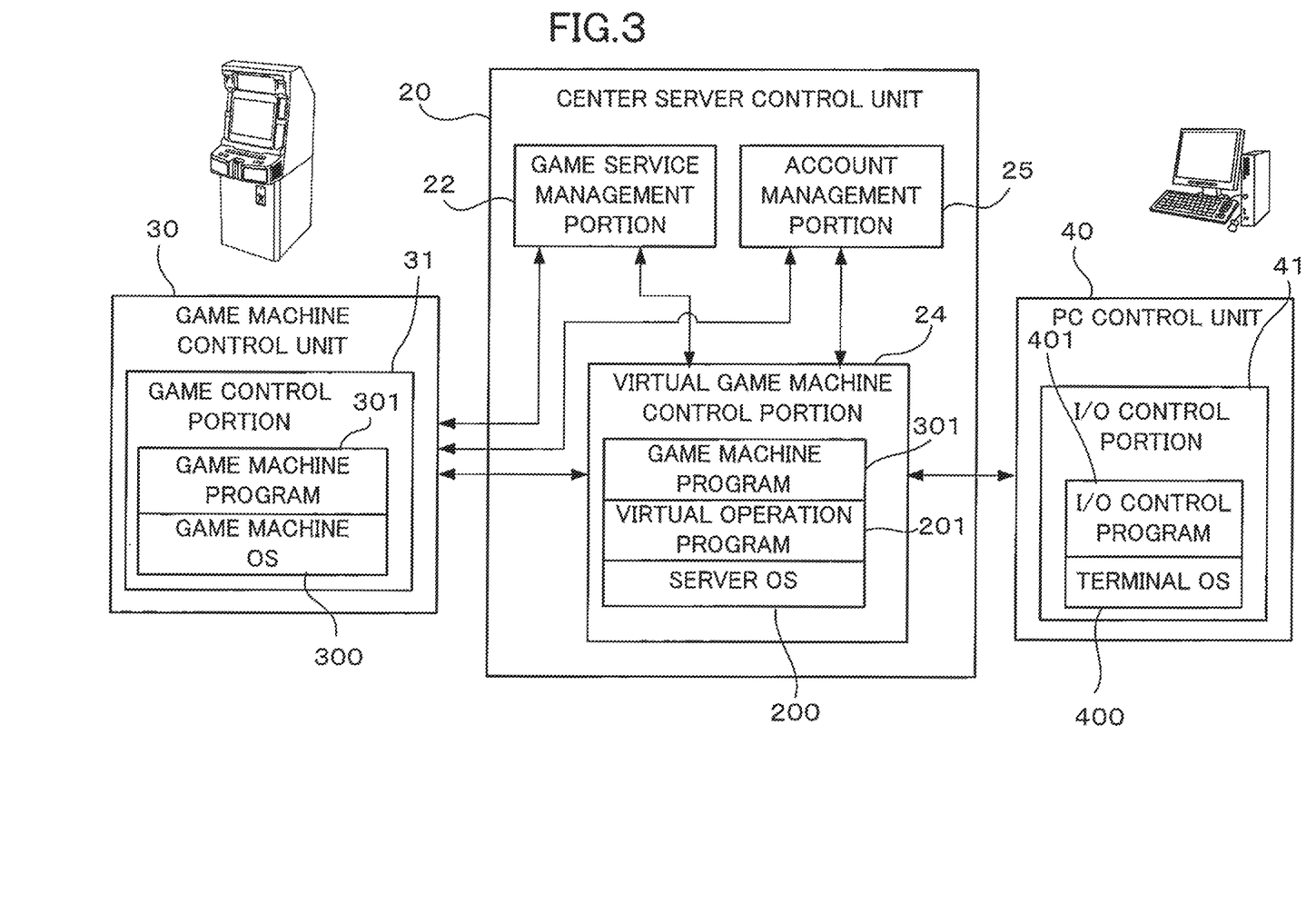
FIG. 3 is a block diagram showing a configuration which is capable of providing a game common between a user of a game machine and a user of a PC.

Next, in reference to FIG. 3, a configuration for making a common game available between a user of the game machine 3 and a user of the PC 4 will be described in details. As shown in FIG. 3, a game control portion 31 is formed in the game machine 3 by a combination of: a hardware resource which is the control unit 30; and software including a game machine OS 300 and a game machine program 301. On the other hand, in the PC 4, an I/O control portion 41 is formed by a combination of: a hardware resource which is the control unit 40; and software including a terminal OS 400 and an I/O control program 401. The game machine program 301 is software which is lent or given from the service provider to the arcade operator, and the I/O control program 401 is lent or given from the service provider to the general operator. On the other hand, the virtual game machine control portion 24 of the center server 2 is formed by a combination of: a hardware resource which is the control unit 2; and software including a server OS (an operating system for server) 200, a virtual operation program 201, and a game machine program 301.

The game machine program 301 which is one of constituent elements of the virtual game machine control portion 24 is the same as the game machine program 301 which is one of constituent elements of the game control portion 31 of the game machine 3. The virtual operation program 201 is middleware for making the control unit 20 of the center server 2 execute the game machine program 301 which is application software created appropriately for the game machine 300. That is, the virtual operation program 201 intervenes between the server OS 200 and the game machine program 301, and by making the control unit 20 of the center server 2 execute the game machine program 301, creates virtually in the center server 2, a control portion similar to the game control portion 31 of the game machine 3, and operates the control portion created. On the other hand, the I/O control program 401 of the PC 4 is application software for making the PC 4 operate as a remote I/O device for the virtual game machine control portion 24. By installing into the PC 4 and executing the I/O control program 401, the PC 4 operates as a remote I/O terminal of thin client architecture based on the Server-Based Computing. The display of the PC 4 is provided with an appropriate interface such as an icon, a menu or the like, for starting up the I/O control program 401 as one of applications. Operation information to the input device 42 of the PC 4 is input to the virtual game machine control portion 24 through the I/O control portion (an I/O control device) 41. Output information (video information and sound information) relating to the game from the virtual game machine control portion 24 is output to a hardware control circuit (a display control circuit and a sound reproduction circuit) of the PC 4 through the I/O control portion 41. Accordingly, by combining the PC 4 and the virtual game machine control portion 24, the game-play environment is established in a similar way to a case of the game machine 3.

The game control portion 31 of the game machine 3 accesses appropriately the game service management portion 22 or the account management portion 25 of the center server 2, in relation to the execution of the game. For example, in a case that a user of the game machine 3 wants to play a common game through the network with the other user, the game control portion 31 requests the matchmaking to the game service management portion 22, and receives a matchmaking result from the game service management portion 22. Alternatively, in a case that the game-play charge is paid by virtual money, the control portion 31 of the game machine 3 accesses the account management portion 25 to require the consumption of the virtual money corresponding to the game-play charge, and receives the result thereof from the account management portion 25. The virtual game machine control portion 34 also accesses the game service management portion 22 or the account management portion 25 appropriately in accordance with instructions of the user transmitted through the I/O management portion 41 of the PC 4, and executes the processing similar to the game control portion 31.

When the matchmaking between users is established, after that, while the game machines 3 exchange operation information with each other by a direct communication under peer-to-peer fashion, the game is executed. Likewise, the virtual game machine control portion 24 is capable of communicating with the game machine 3 or another virtual game machine control portion 24 in peer-to-peer fashion. As with the I/O control portion 41 of the PC 4, also in the user terminal 5, the I/O control portion is formed by a combination of: the control unit 50 of the user terminal 5; and the terminal OS and the I/O control program. However, this illustration is omitted. The virtual game machine control portion 24 is generated each time a user requires game-play from the PC 4 or the user terminal 5, and is erased in response to an instruction to end the game. That is, in a case that N of users access the center server 2 from the PC 4 or the user terminal 5 to require to play the same game as the game machine 3, N pieces of virtual game machine control portions are generated in the center server 2. It is possible to play the common game, not only between a user of the virtual game machine which is realized by the virtual game machine control portion 24 and a user of the game machine 3 which is real, but also between the players of the virtual game machines. Further, in a case that a mode that a user plays a game alone is prepared in the game machine 3, as with the game machine 3, a user of the PC 4 or the user terminal 5 is also able to play the game alone by using the virtual game machine generated by the virtual game machine control portion 24.

Figure 4:
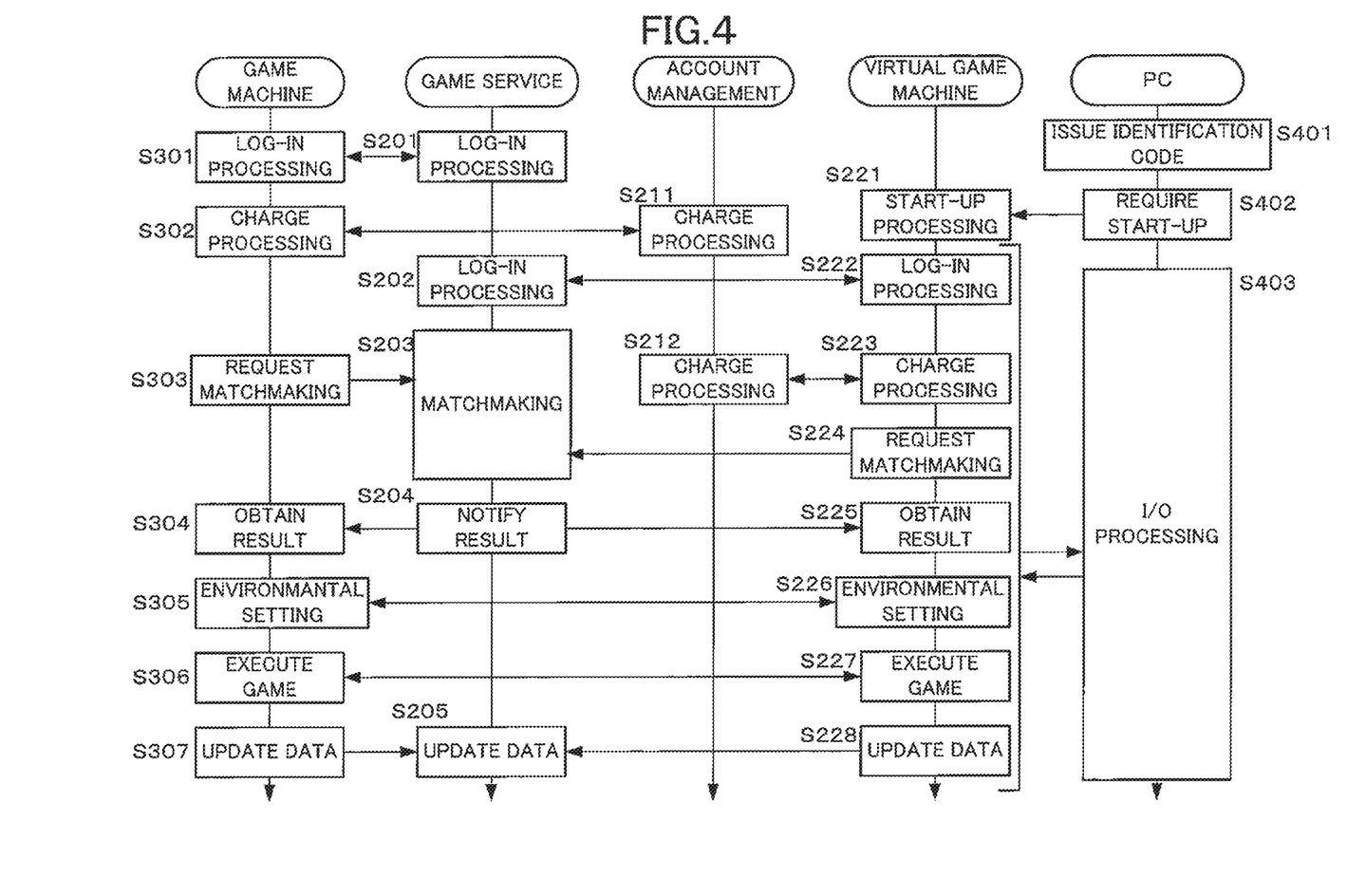
FIG. 4 is a flow chart showing procedures of processing to be executed when the user of the game machine and the use of the pc play a common game.

Next, in reference to FIG. 4, the processing procedures for a case that the user of the game machine 3 and the user of the PC 4 play a common game will be described. In addition, the processing procedures for a case that the user plays the game with the user terminal 5 in place of the PC 4, may be similar to the following processing procedures. Thereby, the detailed explanations with respect to the case of the user terminal 5 are omitted.

First, the processing to be executed by the game machine 3 will be described. When the user starts the game at the game machine 3, log-in processing, that is processing for identifying the user, is executed between the game control portion 31 of the game machine 3 and the game service management portion 22 of the center server 2 (step S301, step S201). In the log-in processing, the game control portion 31 obtains through the card reader 34, the card ID recorded in the card 10 of the user, and notifies the card ID to the game service management portion 22. Upon receiving the card ID, the game service management portion 22 refers to the user management data base DB2 and the game management data base DB4 sequentially to extract from the game management data base DB4, the play data corresponding to the card ID, and transmits the play data extracted to the game control portion 31.

Next, the game control portion 31 requires the game-play charge to the user (step S302). The payment method for game-play in the game machine 3 is selectable between cash or virtual money. FIG. 4 shows processing to be executed when the game-play charge is paid by virtual money. In this case, the card ID or the user ID of the user is notified from the game control portion 31 of the game machine 3. The account management portion 25 of the center server 2 specifies the account of the user which is recorded in the account management data base DB5 in association with the ID notified, and consumes from the account specified, virtual money the amount of which corresponds to the game-play charge (step S211). The game control portion 31, with the charge processing, generates a charge record where matters of the charge are described and records the charge record in its own memory device. The matters of the charge record will be described later. When the charge processing of the game-play charge is completed, the game control portion 31 of the game machine 3 requests the matchmaking to the game service management portion 22 (step S303). In response to this, the game service management portion 22 starts the matchmaking (step S203).

On the other hand, in a case that a user starts to play the game at the PC 4, firstly the I/O control program 401 is started up in accordance with instructions by the user, and processing by the I/O control portion 41 starts. At the moment of start of the processing, the I/O control portion 41 issues an identification code in accordance with predetermined procedures (step S401). The identification code is issued in a case that the game is played at a client device other than the game machine 3, in order to specify a place where the client device belongs. Here, in a case of the PC 4, the place where the client device belongs is classified into each general operator, or each store 7 where each PC 4 was installed. In a case of the user terminal 5, the place where the client device belongs is collectively one classification as a group which is other than the general operator. As one example, when the I/O control program 401 is distributed to the general operator and the user, a serial code which is unique for each destination of the distribution is set, and the serial code is issued as the identification code. The identification code to be issued here is set to a value which does not overlap with neither the chassis IDs set to the game machines 3 nor the store IDs set to the game stores 6. In addition, the correlation between information for specifying the destination of distribution of the I/O control program 401 (for example, the store ID of the general store 7 or the user ID) and the serial code as the identification code is recorded in a predetermined data table which is stored in the tally management data base DB6.

Next, the I/O control portion 41 of the PC 4 requires the virtual game machine control portion 24 of the center server 2 to start up (step S402). At the moment of the requirement, the identification code is notified to the virtual game machine control portion 24. The virtual game machine control portion 24 stores the identification code in its own reserved area of the memory unit 21. When the virtual game machine control portion 24 is started up, and after that, until the game ends, the I/O control portion 41 of the PC 4 executes the I/O processing continuously in order to make the PC 4 function as the remote I/O device for the virtual game machine control portion 24 (step S403).

On the other hand, when the virtual game machine control portion 24 starts its operation, the log-in processing, that is, the processing for identifying the user is executed between the virtual game machine control portion 24 and the game service management portion 22 (step S222, step S202). In the log-in processing, the virtual game machine control portion 24 obtains the card ID of the user through the PC 4, and notifies the card ID obtained to the game service management portion 22. Upon receiving the card ID, the game service management portion 22 refers to the user management data base DB2 and the game management data base DB4 to extract the play data of the user correlated to the card ID, and provides the play data extracted to the virtual game machine control portion 24. The virtual game machine control portion 24 stores the play data provided in its own memory area, and in the ongoing game, refers to and updates the play data at appropriate timings. When the card ID is obtained at the PC 4 or the user terminal 5, since in such client devices, there is no equipment corresponding to the card reader 34, an input method using letter strings and the like is employed. However, the user ID may be used as the identification information in place of the card ID.

After the log-in processing is completed, the virtual game machine control portion 24 requires the game-play charge to the user (step S223). Since the PC 4 does not have any function for accepting the payment by cash for the charge, the charge processing by the virtual game machine control portion 24 is limited to a case that the game-play charge is paid by virtual money. Accordingly, the charge processing by the virtual game machine control portion 24 uses the function of the account management portion 25. Namely, the payment of the game-play charge is realized in such a way that the card ID or the user ID of the user of the PC 4 is notified to the account management portion 25 from the virtual game machine control portion 24, and executed is the processing that the account management portion 25 consumes from the account corresponding to the ID, virtual money the amount of which corresponds to the game-play charge (step S212). The virtual game machine control portion 24 generates, along with the execution of the charge processing, a charge record where the matters of the charge are record, and stores the charge record generated in its own memory area.

When the charge processing for the game-play charge is completed, the game machine control portion 24 requests the matchmaking to the game service management portion 22 (step S224). The matchmaking request is treated by the game service management portion 22, as with the matchmaking request from the game control portion 31 of the game machine 3. The following explanations will be described, on the premise that in the matchmaking started in response to the matchmaking request from the game machine 3 (step S203), the matchmaking request from the virtual game machine control portion 24 has been accepted, and the user of the game machine 3 and the user of the PC 4 have been matchmade.

When the matchmaking is established by the game service management portion 22, the matchmaking result is notified from the game service management portion 22 to each of the game control portion 31 and the virtual game machine control portion 24 (step S204), and is obtained at each of the game control portion 31 and the virtual game machine control portion 24 (step S304, step S225). After that, each of the game control portion 31 and the virtual game machine control portion 24 executes an environmental setting necessary for communicating between the game machine 3 and the virtual game machine control portion 24 in peer-to-peer fashion (step S305, step S226). When the environmental setting is completed, the game control portion 31 and the virtual game machine control portion 24 execute the common game, while exchanging operation information of the users with each other (step S306, step S227). When the game ends, each of the game control portion 31 and the virtual game machine control portion 24 updates the play data of the user held therein, based on the game-play result of the game of this time (step S307, step S228). The play data updated is provided to the game service management portion 22. The game service management portion 22 updates in accordance with the play data provided from each of the game control portion 31 and the virtual game machine control portion 24, the play data which is held in the game management data base DB4 in association with the user ID of each of the users.

By the processing above mentioned, it is possible for a user of the game machine 3 and a user of the PC 4 to join a common game, and progress the game by battling against or cooperating with each other. Likewise, it is also possible for a user of the user terminal 5 to join a game which is common with a user of the game machine 3. In addition, users of the PCs 4, users of the user terminals 5, or a user of the PC 4 and a user of the user terminal 5 can join the same game as the game machine 3 and play the game together. In a case of a game which many people can join, it is possible for users of the game machine 3, the PC 4 and the user terminal 5 to join the common game and play the game together.

Figure 5:
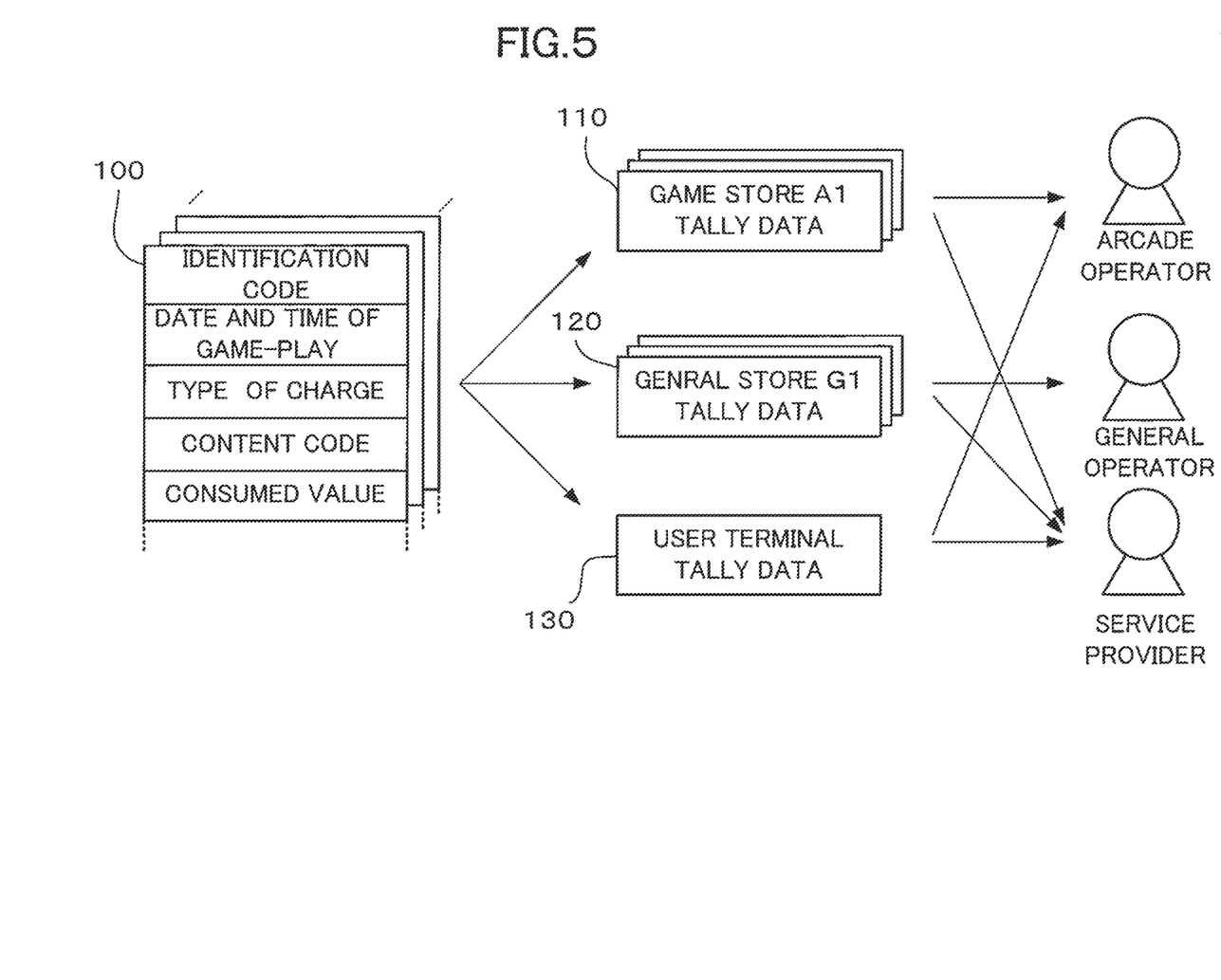
FIG. 5 is a diagram showing a relation between a charge record generated correspondingly to a charge of game-play charge; data for tallies charge results recorded in the charge record as sales figure; and distribution destinations of the sales figures.
Figure 6:
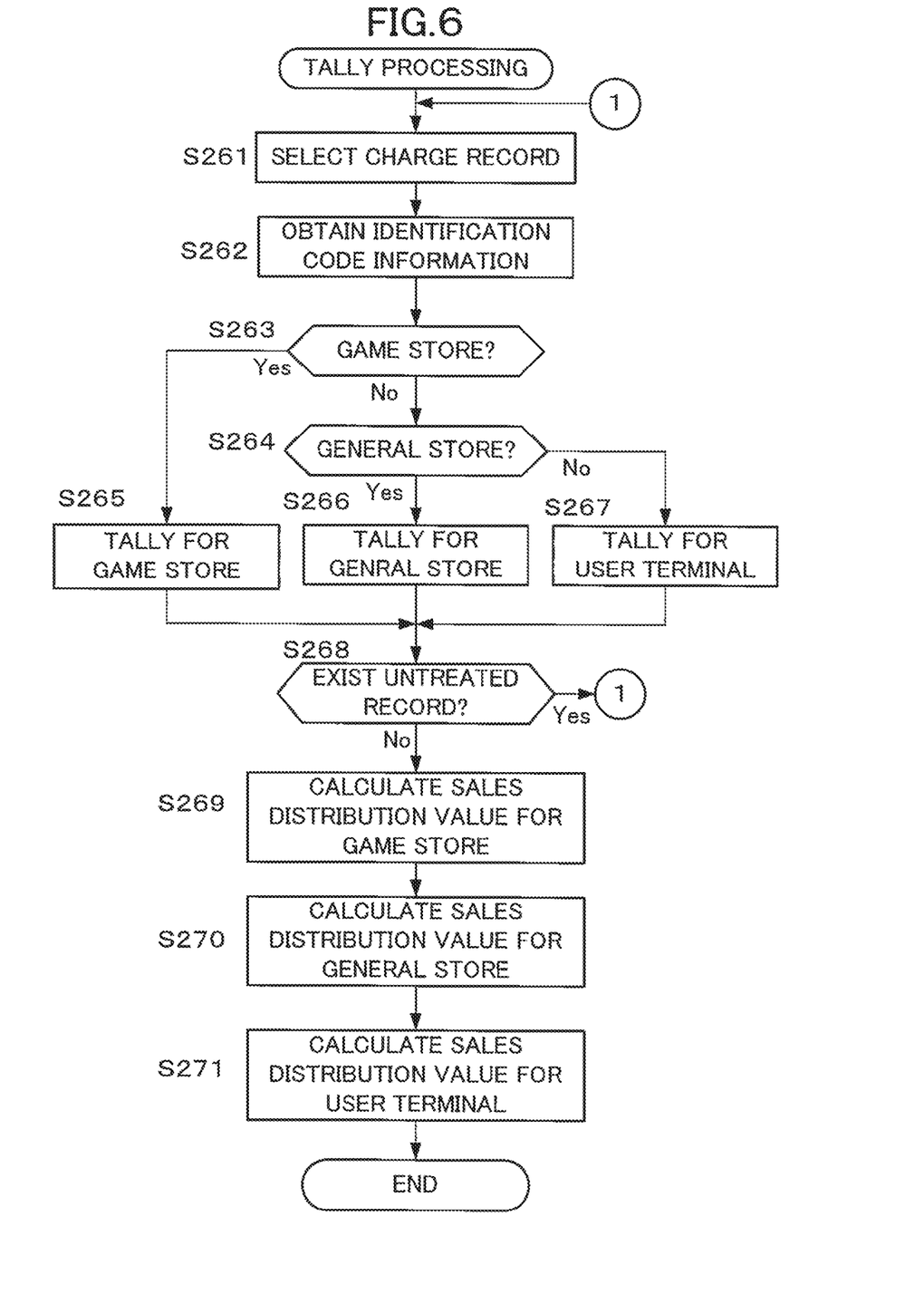
FIG. 6 is a flow chart showing procedures of tally processing to be executed by a center server for generating tally data

Next, in reference to FIGS. 5 and 6, explained will be a system for tallying game-play charges paid by users, recording the sales figures of the game system 1, and distributing the sales figures among the service provider, the arcade operator, and the general operator. FIG. 5 shows a relation between the charge records 100, three kinds of tally data 110, 120 and 130 stored in the tally management data base DB6, and the destinations to be distributed with respect to the sales figures recorded in each tally data 110, 120 and 130. The charge record 100 is a record which is generated each time the game-play charge is required to a user (each time the processing of step S302 or step S223 of FIG. 4 is executed) by the game machine 3 or the virtual game machine control portion 24. The charge record 100 includes such information: an identification code; date and time when the game was played; type of charge; a content code; and a consumed value. The identification code is information for identifying a place where the client device relating to the charge belongs. In a case that the game-play charge is required at the game machine 3, the chassis ID or the store ID relating to the game machine 3 is recorded as the identification code. In a case that the game-play charge is required by the virtual game machine control portion 24, the identification code issued by the I/O control portion 41 is stored. By referring to the identification code, it is possible to recognize which was used the game machine 3, the PC 4, or the user terminal 5, for the game-play the charge record 100 corresponds to.

The tally processing portion 26 of the center server 2 determines the place where the client device corresponding to the generated charge record 100 belongs to, in reference to the identification code. That is, in a case that the chassis ID or the store ID is stored as the identification code, it is possible to determine the game store 6 where the charge processing was executed. Further, in a case that the charge record 100 was generated by the virtual game machine control portion 24, stored in the charge record 100 is the identification code generated so as to be unique for each destination of distribution by the I/O control program 40 which is mounted in the PC 4 or the user terminal 5 which is a counterpart to the virtual game machine control portion 24. Accordingly, in a case that the charge record 100 is generated for the game-play on the PC 4, by referring to a data table where the relation between the identification code (the serial code) 100 and the destination of distribution is recorded, it is possible to specify a general store 7 corresponding to the charge record 100 or the general operator operating the general store 7. Further, in a case that the charge record 100 is generated for the game-play on the user terminal 5, by referring to a data table where the relation between the identification code (the serial code) and the destination of distribution is recorded, it is possible to specify the user of the user terminal 5 corresponding to the charge record 100. However, in a case that the charge record is generated at the user terminal 5, it is enough to recognize that the charge record corresponds to the game-play on the user terminal 5, and it is not always required that the user is specified by the charge record. That is, with respect to the processing for the charge record 100, the following processing is enough: it is possible to specify the place which the charge record was generated for the game-play of, out of the game machine 3 of the game store 6, the PC 4 of the general store 7, and the user terminal 5, and, in a case that the charge record 100 was generated for the game-play of the game store 6 or the general store 7, the store 6 or 7 where the charge record was generated or the operator of the store 6 or 7 is further determined.

The information of type of charge in the charge record 100 is information for recognizing whether the game-play charge was paid by cash (or coins), or by virtual money. Only when the game-play charge was required at the game machine 3, either one of information indicating payment by cash or information indicating payment by virtual money is recorded depending on the selection result of the payment method by a user. When the game-play charge was required by the virtual game machine control portion 24, the information indicating payment by virtual money is recorded. As information of the content code, the unique content code for the game played by the user is recorded. As information of the consumed value, information indicating the value of game-play charge consumed by the user is recorded.

The charge record 100 is recorded temporally in the memory device of the game machine 3, and the memory area of the memory unit 21 used by the virtual game machine control portion 24. And after that, at an appropriate timing, the charge record 100 is read out by the tally processing portion 26 of the center server 2, and is recorded in the tally management data base DB6. Each time a predetermined tally period (for example, one month) has elapsed, the tally processing portion 26 tallies the charge records 100 accumulated in the tally management data base DB6. In this case, by referring to the identification code recorded in the charge record 100, plural types of charge records 100 are tallied so as to be divided into a group of tally data 100 for each game store 6, a group of tally data 120 for each general store 7, and a group of tally data 130 for the user terminal 5. However, the tally data 110 can be tallied data for each arcade operator, and the tally data 120 can be tallied data for each general operator.

As mentioned above, one of reasons why the tally data is generated in classified fashion is that distribution methods of sales figures are different from each other depending on the place which the client device belongs to. That is, there is a difference in the distribution method in such a way that the sales figures obtained by the game-play on the game machine 3 of a game store 6 should be distributed between the arcade operator of the game store 6 and the service provider, while the sales figures obtained by the game-play on the PC 4 of a general store 7 should be distributed between the general operator and the service provider. In the game store 6, while a part of the sales figures is given directly as cash from users to the arcade operator, the remaining part of the sales figures is given to the service provider via consumption of virtual money. The general operator does not accept directly the game-play charge by cash from users, and full value of the game-play charge is given to the service provider via virtual money. In considering such difference, it is necessary to differentiate in distribution processing between the distribution of sales figures corresponding to the game-play of the game store 6 and the distribution of sales figures corresponding to the game-play of a general store 7.

Also, full value of the game-play charge corresponding to the game-play on the user terminal 5 is given to the service provider. The user terminal 5 is equipment for personal use, and is not operated for commercial use. Therefore, no sales figures should be distributed to an operator of the user terminal 5. Then, in the example of FIG. 5, a part of sales figures corresponding to the game-play on the user terminal 5 is distributed to the arcade operator. The reason of this is the following. When a game to be provided by the game machine 3 is also available for the PC 4 or the user terminal 5, it is possible to extend the number of places where the game is available to places other than the game stores 6. Because of this, it becomes possible for a user, who was originally supposed to go to the game store 6, to play the game at a place other than the game store 6. Therefore, this system is configured so that a part of sales figures the service provider obtained through the game-play on the user terminal 5 is distributed to the arcade operators, in order to improve their gainings. In this way, it is necessary that the game-play charge obtained by the game-play on the user terminal 5 is handled further distinctively from the sales figures of the store 6 or 7.

As mentioned above, in the game system 1, it is necessary to classify tally data depending on the place which the client device where the game was played belongs to, and to change calculation processing for distribution of sales figures depending on the classification of tally data. Therefore, in this system, the identification code is recorded in the charge record 100, and the tally processing portion 26 is made to execute different processing depending on the identification code.

FIG. 6 shows tally processing which is executed at a predetermined interval by the tally processing portion 26. When starting the tally processing, the tally processing portion 26 firstly selects the charge record 100 untreated, which is stored in the tally management data base DB6 (step S261), and obtains information of the identification code recorded in the charge record 100 selected (step S262). After that, the tally processing portion 26 determines based on the identification code, whether the charge record 100 is a record corresponding to a game store 6 (step S263). When this determination is negative, it is determined whether the charge record 100 is a record corresponding to a general store 7 (step S264). When the charge record 100 corresponds to the game store 6, the tally processing portion 26 records the charge record 100 in the tally data 110 as sales performance of the game store 6 corresponding to the identification code (step S265). When the charge record 100 corresponds to the general store 7, the tally processing portion 26 records the charge record 100 in the tally data 120 as sales performance of the general store 7 corresponding to the identification code (step S266). When the charge record 100 is a record corresponding to a user terminal 5, the tally processing portion 26 records the charge record 100 in the tally data 130 as sales performance of the user terminal 5 (step S267). After executing any one of steps S265 to S267, the tally processing portion 26 determines whether an untreated charge recode 100 still remains. When the untreated charge recode 100 still remains, the tally processing portion 26 returns to step S261. The tally processing portion 26 repeats the processing of steps S261 to S268 until the untreated record does not exist.

When all records are treated to generate the tally data 110, 120 and 130, subsequently the tally processing portion 26 calculates the sales figure for each data 110, 120, 130, and calculates sequentially the distribution value of the sales figures for each of the arcade operator, the general operator, and the service provider (steps S269 to S271). The calculated results of them are recorded in the tally management data base DB6. When completing the calculation of the distribution values, the tally processing portion 26 ends the processing shown in FIG. 6. The distribution values recorded in the tally management data base DB6 are transacted between the service provider and the operator in accordance with the procedure and the timing determined for each operator. Further, the part of sales figures distributed to the service provider may be further distributed to an owner of copyright relating to the game, and an enterprise such as a maintenance management company for the center server 2.

The present invention is not limited to the embodiment mentioned above, and various kinds of changes and variations are also available. For example, the game machine is not limited to a game machine installed to a game store, and may be a game machine installed to various kinds of facilities. The game machine is not limited to a game machine for commercial use. By applying the present invention between various kinds of games machines as well as a game machine for home use and network terminal devices other than such game machines, the system may be configured so that a common game is played by users between those devices. The server device is not limited to a server device which provides service of matchmaking to users. For example, in a case that a ranking of users are generated in reference to the play data of each user and the ranking is published on a network, an individual game may be configured so as to be played by a user alone. It is not necessary that the network terminal devices are always provided as terminal devices to be lent to users in general stores and personal terminal devices for users, and only either the terminal devices to be lent to users or the personal terminal devices for users may be made to function as the network terminal devices of the present invention. It is not necessary that a general store is really existing one, and the general store may be a store provided virtually.

Further, the configuration for realizing the virtual game machine control device on the server device is not limited to the embodiment mentioned above, and the variations thereof are available. For example, it may be applied as a configuration of providing the virtual game machine control device to the server device, that an emulator for operating a game machine OS on a server OS is mounted to the server device, and the game machine program is made to operate on the game machine OS as an application software.

In the above embodiment, virtual money is used for the charge processing at the moment when a game is played at the network terminal device. However, as long as the game-play charge is paid by a user by using electronic information, various kinds of payment methods can be employed as an electronic payment device. For example, the electronic payment device may be configured by employing the payment method using a credit card and a debit card. Even when virtual money is used, the balance is not limited to an example that the balance is held in the account on the server device. The balance of virtual money may be held in various kinds of media such as a card owned by a user, an IC chip of a portable phone, or the like. The payment device using virtual money may be configured as a postpaid type, not only as a prepaid type. Further, in the embodiment mentioned above, an example where a user is made to play a paid-for game was explained, but the present invention can be also applied to a system where a game is played for free.

What is claimed is:

1. A game system including:
   a server device including a memory device including a first game machine program stored thereon for use in generating a first game on the server device for executing a common game;
   a game machine which functions as a client device for the server device, the game machine including a memory device including a second game machine program stored thereon for use in generating a second game on the gaming machine for executing the common game; and
   a network terminal device which functions for the server device as another client device that differs from the game machine;
   wherein the server device making a computer unit of the server device function as a device providing service to the game machine by executing a server program;
   wherein the second game machine program stored on the game machine makes a computer unit of the game machine function as:
      a device allowing a user to play the second game via the game machine; and
      a device accepting the service from the server device by communicating with the device providing the service, the service relating to game-play of the second game as well as identifying a user in cooperation with the server device;
   wherein the server device is provided with a virtual game machine control device which, by executing the first game machine program stored on the server device, makes the computer unit of the server device function as:
      a device allowing a user to play the first game via the network terminal device; and
      a device accepting the service by communicating with the device providing the service;
   wherein the network terminal device is provided with a computer unit of the network terminal device, the computer unit functioning as an input and output (I/O) control device which makes the network terminal device function as a remote I/O device for the virtual game machine control device by executing a predetermined I/O control program; and
   wherein the virtual game machine control device causes the computer unit of the server device to exchange game play data of the common game between the server device and at least one of the game machine and the network terminal device.

2. The game system according to claim 1, wherein
   a virtual operation program intervenes as middleware between:
   an operating system for server which is software to be combined with the computer unit of the server device; and
   the first game machine program, and the computer unit of the server device is made to execute the first game machine program through the virtual operation program to provide the virtual game machine control device.

3. The game system according to claim 1, wherein
   the server device executes, as the service relating to the game-play, service that the server device stores play data in association with identification information of the user in a memory unit of the server device, the play data corresponding to a result of the game that the user played using either the game machine or the virtual game machine control device, and also
   the server device identifies the user and provides to either the game machine or the virtual game machine control device, the play data stored in association with the identification information of the user in the memory unit.

4. The game system according to claim 1, wherein
   the server device provides, as the service relating to the game-play, service that the server device matchmakes a plurality of users and makes the plurality of users participate in the common game, to the game machine and the virtual game machine control device;
   wherein the virtual game machine control device causes the computer unit of the server device to exchange game play data between the first game machine program executed on the server device and the second game machine program executed on the game machine to allow a user of the game machine and a user of the network terminal device to play the common game.

5. The game system according to claim 1, wherein
   the game machine is configured so that the game-play is allowed in exchange of payment of a predetermined game-play charge, and
   the server device comprises an electronic payment device which executes the payment of the predetermined game-play charge of a user by an exchange of electronic information, when the game is played with the virtual game machine control device.

6. A game execution control method applied to a game system including:
   a server device including a memory device including a first game machine program stored thereon for use in generating a first game on the server device for executing a common game;
   a game machine which functions as a client device for the server device, the game machine including a memory device including a second game machine program stored thereon for use in generating a second game on the gaming machine for executing the common game; and
   a network terminal device which functions for the server device as another client device that differs from the game machine;
   wherein the server device making a computer unit of the server device function as a device providing service to the game machine by executing a server program;
   wherein the second game machine program stored on the game machine makes a computer unit of the game machine function as:
      a device allowing a user to play the second game via the game machine; and
      a device accepting the service from the server device by communicating with the device providing the service, the service relating to game-play of the second game as well as identifying a user in cooperation with the server device;
   the game execution control method including the steps of:
      providing the network terminal device with a computer unit of the network terminal device, the computer unit functioning as an input and output (I/O) control device which executes a predetermined I/O control program, while providing the server device with a virtual game machine control device which, by executing the first game machine program stored on the server device executes the game machine program, making a computer unit of the server device function as:
- a device allowing a user to play the first game via the network terminal device;
- a device accepting the service by communicating with the device providing the service by the virtual game machine control device, and making the network terminal device function as a remote I/O device for the virtual game machine control device, by executing the predetermined I/O control program by the I/O control device; and
- wherein the virtual game machine control device causes the computer unit of the server device to exchange game play data of the common game between the server device and at least one of the game machine and the network terminal device.

* * * * *